July 24, 1962  G. FRANKEL  3,045,567
PHOTOGRAPHIC TYPE COMPOSING APPARATUS
Filed July 20, 1959  8 Sheets-Sheet 1
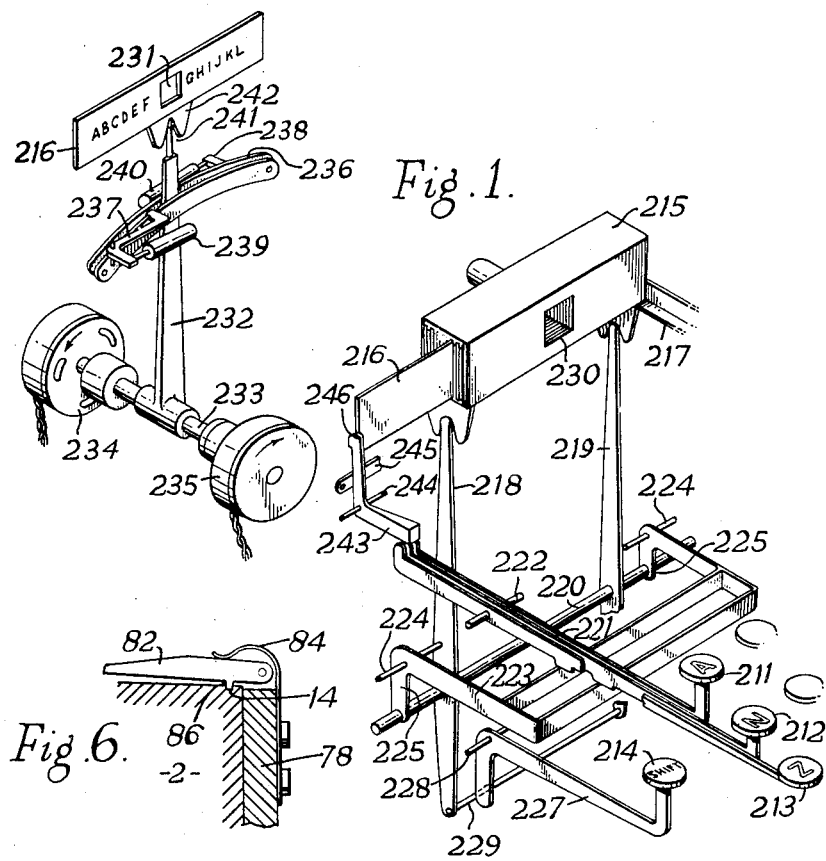

July 24, 1962  G. FRANKEL  3,045,567
PHOTOGRAPHIC TYPE COMPOSING APPARATUS
Filed July 20, 1959  8 Sheets-Sheet 2
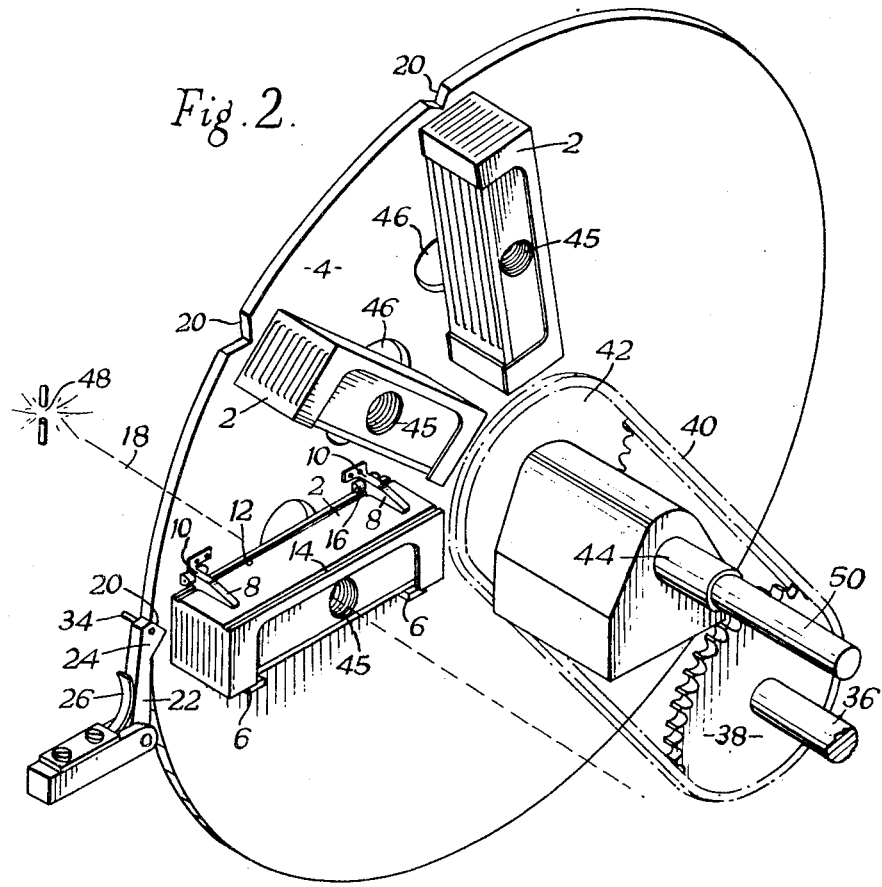
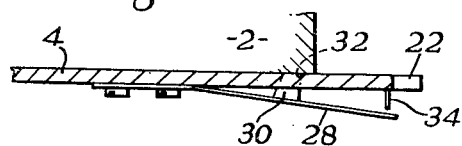

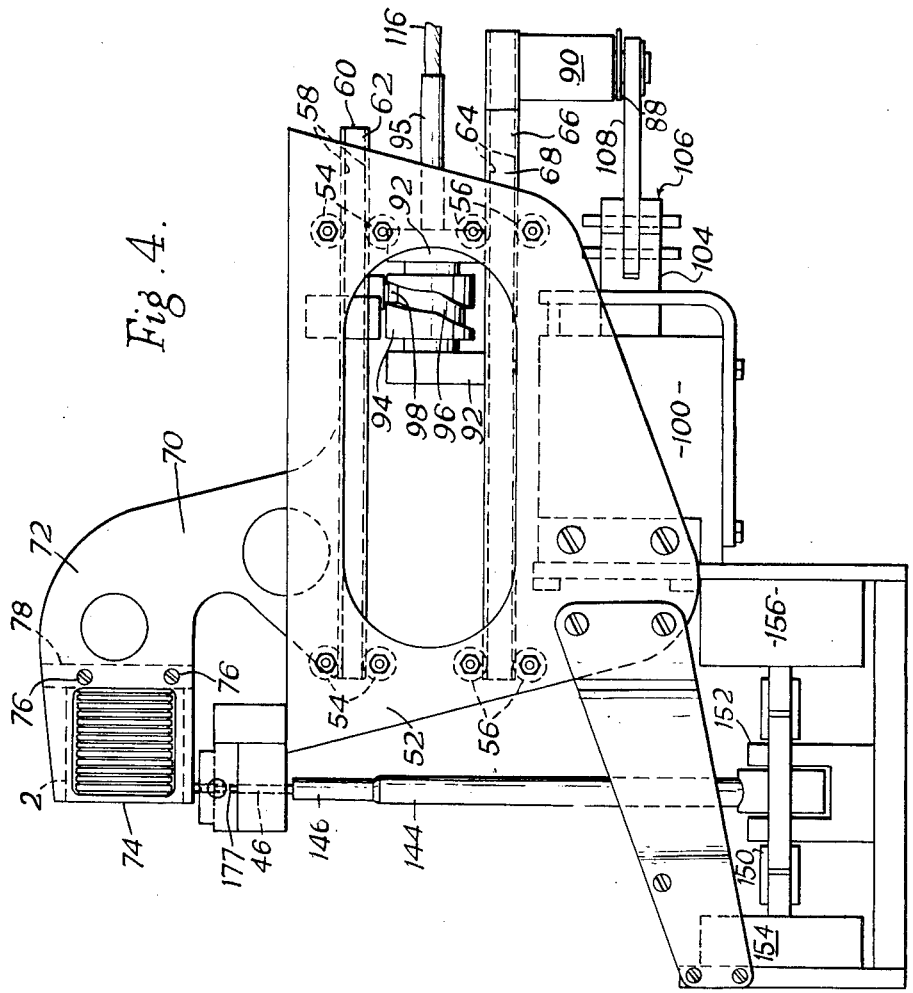

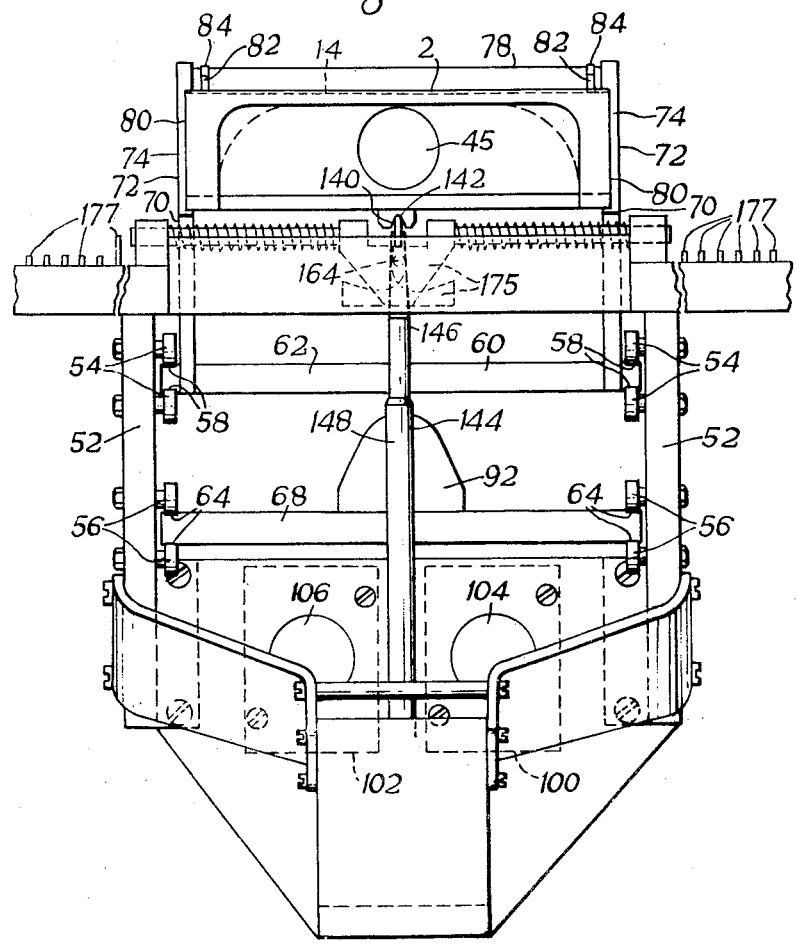

July 24, 1962  G. FRANKEL  3,045,567
PHOTOGRAPHIC TYPE COMPOSING APPARATUS
Filed July 20, 1959  8 Sheets-Sheet 5

July 24, 1962 G. FRANKEL 3,045,567
PHOTOGRAPHIC TYPE COMPOSING APPARATUS
Filed July 20, 1959 8 Sheets-Sheet 6

July 24, 1962 G. FRANKEL 3,045,567
PHOTOGRAPHIC TYPE COMPOSING APPARATUS
Filed July 20, 1959 8 Sheets-Sheet 7
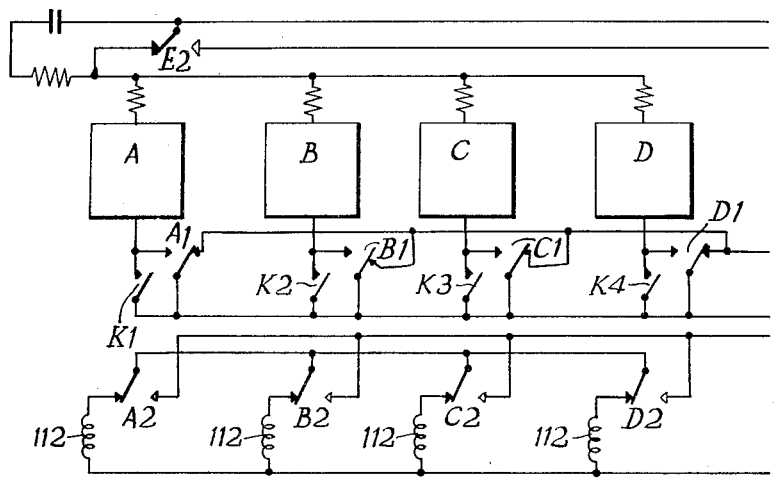
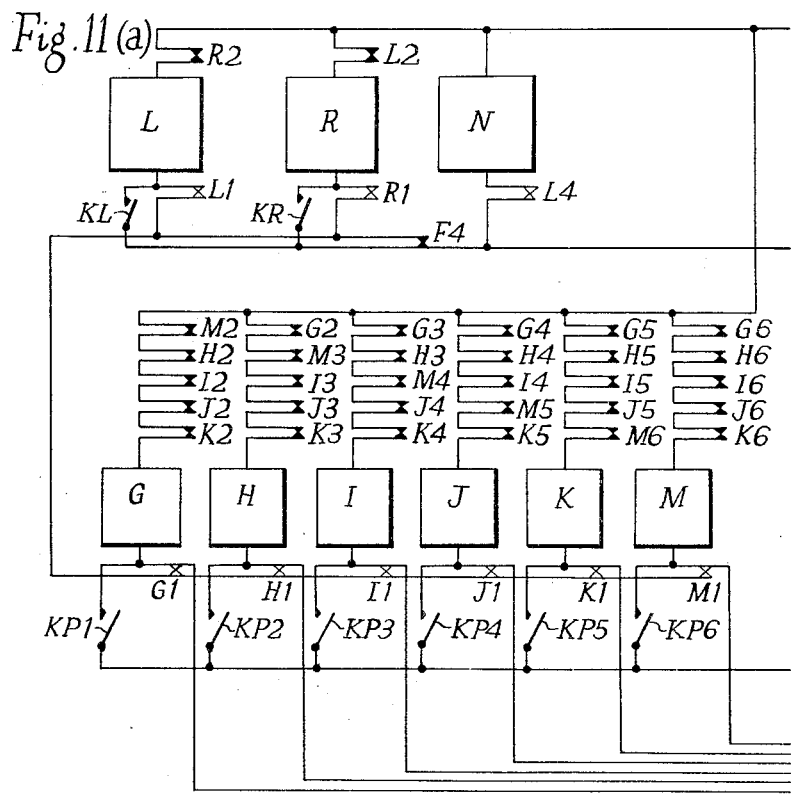
Fig. 11(a)

3,045,567
PHOTOGRAPHIC TYPE COMPOSING
APPARATUS
Gerald Frankel, Wembley Park, England, assignor to
Caps Limited, London, England
Filed July 20, 1959, Ser. No. 828,109
Claims priority, application Great Britain July 22, 1958
18 Claims. (Cl. 95—4.5)

This invention relates to photographic type composing apparatus in which individual characters are selected from a character matrix and located in the required position in an optical projection system for the projection of images thereof onto a radiation sensitive surface on which composing takes place.

In such apparatus the characters may be selected by the operation of a keyboard. Normally, the number of characters required in any one font is not less than 90 and may extend up to 135. However, on a normal four-row keyboard there are only about 45 characters immediately available and this number is multiplied by the use of shift keys.

It is an object of the invention to provide a character matrix and means for selecting and correctly positioning characters carried thereby, suitable for use in a photographic type composing apparatus with the normal type of keyboard having a number of rows of characters and shift keys for multiplying the number of characters available.

It is a further object of the present invention to provide in or for use in a photographic type composing apparatus of the kind set forth a mounting for a plurality of fonts of characters and means whereby rapid and effective changing from operation with one to operation with a different font of characters is facilitated.

In the apparatus of the invention there is provided a matrix magazine carrying a number of slides, each of which carries a row of characters, means for moving the matrix magazine towards or away from the radiation sensitive surface so as to bring a selected slide into the focal plane for projection and means for moving the slide in the focal plane to align the selected character in the optical path of the projection system.

Further, in accordance with the invention there are provided in or for use in a photographic type composing apparatus of the kind set forth a mounting for a plurality of matrix magazines, each carrying a number of slides providing rows of characters, means for locating the mounting in different positions, in each of which a magazine is disposed in the optical path of the projection system, means for adjusting the position of the magazine in said optical path so as to bring a selected matrix slide in the magazine into the focal plane of the optical projection system and means for moving the slide in the focal plane to align a character carried thereby for projection onto the radiation sensitive surface.

The mounting may comprise a rotatable turret plate carrying a number of radially disposed matrix magazines, means being provided to rotate the turret plate to bring a selected magazine into the position in the optical path of the projection system.

In one form of construction in accordance with the invention there are provided means for withdrawing the matrix magazine disposed in the optical path from the mounting whilst retaining the magazine in the optical path and means for adjusting the position of the withdrawn magazine to bring a slide into the focal plane of the projection system.

In a preferred form of the invention, the mounting for the matrix magazine comprises a vertically positioned turret plate arranged to rotate on a horizontal axis and carrying a number of radially disposed matrix magazines and there are provided means for rotating the turret plate to bring it into a number of different positions in each of which a magazine is disposed in the optical path of the projection system, means for withdrawing from the turret plate the magazine disposed in the optical path of the projection system and for holding the magazine in the said optical path, means for moving the withdrawn magazine towards or away from the radiation sensitive surface so as to bring a selected matrix slide into the focal plane of the projection system and means for moving the slide in the focal plane to align a character for projection onto the radiation sensitive surface.

The general arrangement of slides in a magazine may be such that when used with a keyboard having a number of shift keys, each row of characters on a slide corresponds to a row of characters on the keyboard so that the number of slides will correspond to the number of rows of characters made available by the keyboard in conjunction with the shift keys. Further, the slides may be grouped in sections, one grouped section corresponding to the rows of characters made available by the keyboard without the use of a shift key and the other sections corresponding to the groups made available by the operation of the shift keys. Thus with four rows of characters on the keyboard and two shift keys, which make twelve rows of characters in all available, there will be twelve slides in each matrix magazine arranged in three sections or groups of four slides each. Using this arrangement, when a matrix magazine is withdrawn from the mounting and disposed in operative position in the optical path of the projection system, actuation of any character key, when no shift key is depressed, will first bring the slide carrying that character into the focal plane of the projection system and then move the slide into a position in which the selected character is aligned for projection. Operation of a shift key, will move the matrix magazine in the optical path into a position in which the corresponding section or group of slides are so positioned that operation of a character key will first bring the slide carrying the selected character into the focal plane and then move the slide into a position in which the selected character is aligned for projection.

The slides may be arranged to move longitudinally in both directions from a rest position so that a character on one half of the slide is brought into the desired position by movement in one direction and a character on the other half of the slide is brought into position by movement in the other direction.

The invention is illustrated, by way of example, in the accompanying drawings, in which—

FIG. 1 shows schematically a simple form of construction in accordance with the invention for bringing one of a number of slides mounted in a magazine into the focal plane and means for moving the selected slide in the focal plane to align the selected character in the optical path of the projection system, and FIGS. 2 to 10 show a construction in accordance with the invention providing a plurality of magazines, including means for selecting a magazine, means for selecting and locating a slide and means for selecting and locating a particular character on the selected slide.

In FIGS. 2 to 10,

FIG. 2 is a perspective schematic illustration of a mounting for a plurality of matrix magazines;

FIG. 3 is a fragmentary sectional plan view illustrating a detail of FIG. 2;

FIGS. 4 and 5 are respectively side and front elevations of parts of the apparatus associated with the mounting of FIG. 2;

FIG. 6 shows a detail of the apparatus illustrated in FIGS. 4 and 5;

FIG. 7 illustrates diagrammatically in perspective a drive mechanism for a drum cam illustrated in FIG. 4;

Figure 8:
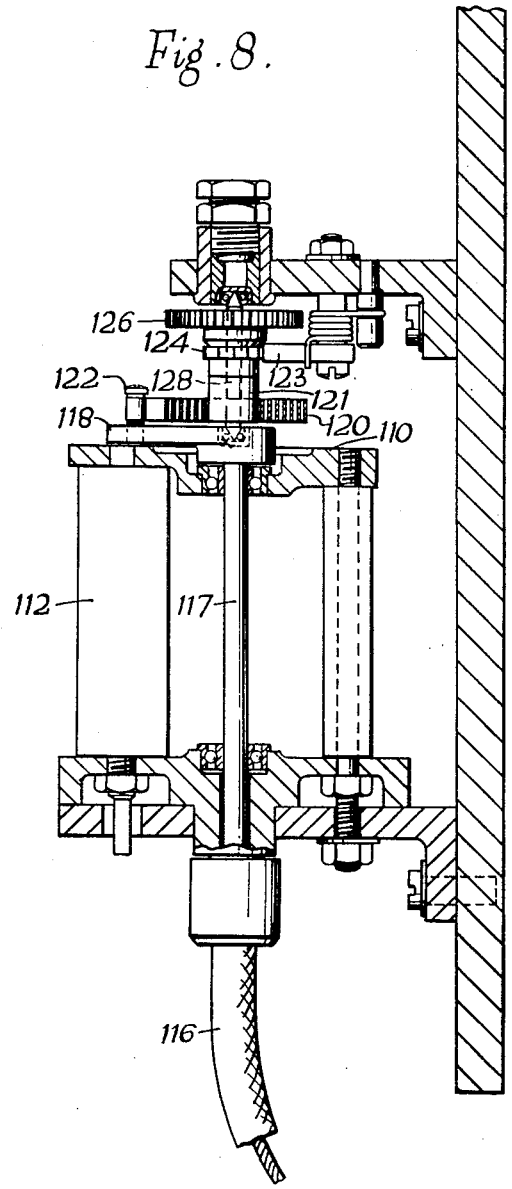
FIG. 8 is a section showing in more accurate detail parts of the drive mechanism of FIG. 7.

Referring to FIG. 1, the construction illustrated comprises a keyboard with three rows of characters 211, 212 and 213 (shown in part only) and two shift keys, one of which is shown at 214. Each row of the keyboard contains twelve characters so that one hundred and eight characters in all are made available by the keyboard in conjunction with the shift keys. The matrix magazine consists of an elongated box 215 carrying nine slides, generally represented by reference number 216, each of which carries twelve character representations. The ends of the box 215 are open or slotted to permit the slides 216 to move out of and into the box. The slides 216 are grouped in three sections of three slides each. One section corresponds to the three rows of characters of the keyboard in normal operation and each of the other sections corresponds to the three rows provided by the actuation of one of the shift keys. The slides are arranged to move on guides in the box 215 to the right and to the left and movement of a slide from the rest position will cause the slide to protrude from an end of the box 215.

The matrix magazine 215 is arranged to be moved in a horizontal direction on guides 217 (one only of which is shown) towards and away from the radiation sensitive surface by pivoted arms 218, 219, pivoting on cross-bar 220. With the magazine 215 in the normal position, ie.e. no shift key being in operation, the three slides corresponding to the three rows of characters provided by the keyboard in this position, are in the operative position in which one of the three slides in question may be brought into the focal plane by the actuation of a key of the corresponding row of the keyboard. This is effected by the depression of the key and thus of the corresponding keyshank pivoting on cross-bar 222 and generally represented by reference numeral 221, to depress cradle 223 pivoting on cross-bar 224. Cross-bar 220 passes through the downwardly bent extensions 225, 226 of the sides of cradle 223, so that the depression of cradle 223 moves cross-bar 220 and thus the arms 218 and 219 and magazine 215. On release of the key, the keyshank 221, cradle 223, arms 218 and 219 and magazine 215 are returned to the starting position by a spring or springs (not shown).

When shift key 214 is depressed it acts through its cranked shank 227 pivoted on cross-bar 228 to move the cross-bar 229, connecting the lower ends of arms 218 and 219, and thus to move the arms 218 and 219 to bring the section of three slides corresponding to the rows of characters which are now available on the keyboard into the operative position, in which one of the three slides in question may be brought into the focal plane in the manner described above by operation of a key. The second shift key, which is not shown, operates in a similar fashion to bring the third group or section of slides into the operative position.

The magazine box 215 is provided with an aperture 230 through which light may be passed through the box. Each slide 216 has a similar aperture 231, so that when all the slides are in the central or rest position light may be passed through the matrix magazine.

The means for moving a slide 216 in the focal plane so as to locate a character in the aperture 230 is shown out of position for the sake of clarity. It comprises a pivoting lever 232 fixedly mounted on a shaft 233 adapted to be rotated in one direction (to the left looking at the the drawing) by a rotary solenoid 234 and in the other direction by a rotary solenoid 235. The lever 232 is guided in a slot 236 and is held in the central or rest position by spring detents 237, 238 which are arranged to be released by solenoids 239, 240 respectively. The upper end of the lever 232 fits into a notch 241 formed in a projection 242 of the slide 216. The bottom of box 215 is grooved to permit movement of projection 242 with the slides 216. The characters on each slide 216 are arranged in groups on each side of the aperture 231 and the slides are arranged to be moved to the right or to the left as required to bring the selected character into position facing the aperture 230. The keyboard is arranged to correspond.

A bent stop arm 243 pivoted on a cross-piece 244 is provided for each set of three aligned character keys corresponding to the three characters occupying similar positions on the three slides of a section and the stop arms, one of which is shown at 243, are located in accordance with the character arrangement of the slides and the keyboard on each side of the magazine box 215. An electrical contact 245 mounted on one side of the magazine box 215 is adapted to be actuated by the stop arms 243 on that one side and a similar electrical contact (not shown) mounted on the other side of the magazine box 215 is adapted to be actuated by the stop arms on that other side. Actuation of the contact 245 serves to energise solenoids 239 and 234 and actuation of the other contact referred to serves to actuate solenoids 240 and 235.

As previously stated the depression of a key of the keyboard acts through its keyshank to depress cradle 223 and thus to move arms 218 and 219 and magazine 215 to bring a slide into the focal plane. This movement of the key and keyshank also causes the corresponding stop arm to move into a position in which its end (indicated as 246 for stop arm 243) will act as a stop for the slide in the focal plane. In this position, contact 245 or its counterpart on the other side of the magazine box 215 is actuated. Actuation of contact 245 causes solenoid 239 to be energised to move detent 237 to release lever 232 for movement to the left (looking at the drawing) and solenoid 234 to be energised to rotate lever 232 to the left until the slide 216 carried by the lever 232 contacts the end (246) of the stop arm (243) which has been moved into the stop position. In this position of the slide the selected character will be in the position for projection facing the aperture 230. Similarly depression of a key actuating a stop arm on the right (looking at the drawing) of magazine box 215 will cause the electrical contact on that side to be made and will result in the energisation of solenoids 240 and 235 to move the slide now in the focal plane to the right.

The electrical contact 245 or its counterpart may also act to start the operation of a shutter of the optical projection system after an appropriate delay period to allow the selected character to find its position. At the end of the exposure period the operative solenoids 234 and 239 or 235 and 240 are de-energised and lever 232, slide 216 and detent 237 are returned to the rest position. The key and its shank 224 and the stop arm 243 are also returned to the rest position.

By arranging the characters on the slides 216 on both sides of the aperture 231, the maximum movement required for each slide is reduced.

In the apparatus described above it is a simple matter to substitute one font of characters for another font. This may easily be done by changing the matrix magazine.

The construction illustrated in FIGS. 2 to 10 will now be described.

Referring to FIG. 2, a plurality of matrix magazines 2 are supported on a mounting in the form of a circular turret plate 4 in respective, radially inwardly extending positions. Although only three magazines are shown in the drawing, the turret plate accommodates nine magazines, and can be designed to accommodate more magazines if required. Each magazine 2 rests upon two feet 6 which extend normal to the turret plate 4 and is held in position by two forks 8 which are pivotally mounted at their rearward ends on the plate 4 and biassed by springs 10 to positions in which they extend normal to the turret plate 4. Each magazine 2 is formed in its upper surface, adjacent the edges thereof extending parallel with the turret plate 4, with grooves 12 and 14 and the forks 8 are formed with nose pieces 16 which engage within the groove 12. When the nose pieces 16 of the forks 8 engage the groove 12, the forward ends of the forks are spaced a short distance from the upper surface of the magazine for the purpose hereinafter described.

The optical path of the photographic type composing apparatus indicated by the broken line 18 and there are provided means for locating the mounting or turret plate 4 in different positions in which the respective magazines are disposed in the optical path. These means comprise V-shaped notches 20 formed in the periphery of the plate at spaced locations corresponding with the positions of the magazines and a pivotally mounted detent 22 having a V-shaped head 24 for co-operating with the notches 20, the detent 22 being biassed by a spring 26 towards the periphery of the turret plate 4.

As illustrated in FIG. 3, the turret plate 4 is provided at each magazine position and on the surface thereof remote from the magazines with a leaf spring 28 secured at its inner end to the turret plate and provided intermediate its ends with a part 30 which engages within an aperture 32 formed in the turret plate and contacts the back of the corresponding magazine. Upon removal of the magazine from the turret plate, the part 30 passes forwardly through the aperture 32 and the spring 28 moves into contact with the turret plate and in so doing, a hole formed in the outer end of the spring 28 is threaded over a pin 34 provided on the head 24 of detent 22. In this way the turret plate is locked against rotation whenever the magazine is withdrawn therefrom along the optical path 18.

For positioning a particular font of type in the optical path of the apparatus, a graduated dial (not shown) is provided adjacent the keyboard of the apparatus and rotation of the dial effects rotation of a shaft 36 which carries a sprocket 38. An endless chain 40 couples the sprocket 38 with a sprocket 42 which is mounted on a centrally disposed, forwardly extending hollow shaft 44 provided on the turret plate 4. Thus, upon rotation of the dial through a suitable angle, the turret plate is rotated to bring a predetermined matrix magazine in alignment with the optical path 18. The matrix slides in each magazine are formed with central apertures 45 co-axial with an aperture 46 formed in the turret plate so that upon positioning of a magazine in the optical path 18 light from a light source may pass through the turret plate 4 and magazine 2.

Associated with the turret plate 4 is a shutter (not shown) in the form of a disc mounted on a shaft 50 which extends through the hollow shaft 44, the disc being formed with an appropriate aperture which, upon rotation of the disc shutter at predetermined speed, registers with one of the apertures 46 of the turret plate to allow the passage of light from the source 48 for a predetermined time interval.

Referring now to FIGS. 4, 5 and 6, extending forwardly from the turret plate 4 on opposite sides of the optical path 18 are two parallel upright side plates 52 which each carry two upper spaced pairs of idler rollers 54 and two lower spaced pairs of idler rollers 56. The pairs of rollers 54 engage tracks 58 formed in lateral extremities of a member 60 of an upper trolley 62, whilst the pairs of rollers 56 engage tracks 64 formed in lateral extremities of the member 66 of the lower trolley 68.

Inwardly of the pairs of rollers 54, there are mounted on the member 60 of the upper trolley 62, two parallel upright plate members 70 each of which is formed with a rearwardly extending part 72 terminating at its rear end in a substantially rectangular shaped portion 74. Rear upright sides of the portions 74 are secured by screws 76 to a transverse, upright back plate 78 formed with a central aperture.

The rectangular shaped portions 74 are formed on their inner surfaces with respective slots 80 wherein, upon moving the upper trolley 62 rearwardly towards the turret plate 4, are engaged respective opposite end parts of the magazine 2 disposed in the optical path 18 of the apparatus.

As seen more particularly in FIGS. 5 and 6, pivotally mounted at an upper edge of the back plate 78 are two forks 82 biassed by springs 84 towards positions in which they extend rearwardly from the plate 78. Each fork 82 is formed on its lower surface with a nose piece 86 which, when the upper trolley 62 is moved forwardly towards the turret plate 4, engages within the groove 14 formed in the upper surface of the corresponding magazine 2. When engaged in the groove 2 the rearward ends of the forks 82 are disposed, as shown in FIG. 6 a short distance above the magazine 2.

It will be appreciated that as the trolley 62 is moved rearwardly towards the turret plate 4, the rearward tapering ends of the forks 82 engage beneath the forks 8 thereby causing the forks 8 to become disengaged from the groove 12 as the nose pieces 86 of the forks 82 engage in the groove 14. Conversely, when the trolley 62 is employed to remount a magazine 2 on the turret plate, the trolley 62 is moved rearwardly towards the turret plate and in the course of such movement the forward end of the forks 8 engage beneath the forks 82 thereby causing disengagement of the forks 82 from the groove 14 and engagement of the forks 8 in the groove 12.

The trolleys 62 and 68 for the purpose of engaging the magazine 2 in and disengaging the magazine 2 from the portions 74 of the upper trolley 62 are arranged to move rearwardly and forwardly in unison, the rearward movement being effected by a thrust applied to the forward end of trolley 68 and the forward movement being caused by a spring link 88 connected to an abutment 90 on the lower trolley 68 which biasses the trolleys 68 and 62 forwardly. To this end, mounted in substantial bearings 92 on the member 66 of the lower trolley 68 is a drum cam 94 formed with a track 96 within which is engaged a roller 98 mounted on the underside of the member 60 of the upper trolley 62. During rearward and forward movement of the trolleys 62 and 68 for the purpose of coupling and uncoupling a magazine 2, the track 96 of the drum cam 94 remains stationary relative to the roller 98 so that no relative movement of the trolleys 62 and 68 takes place.

The drum cam 94 is employed to effect movement of the upper trolley 62 relative to the lower trolley 68 for the purpose of positioning matrix slides contained in a magazine mounted in the trolley 62 in the focal plane of the optical projection system of the apparatus. Each matrix magazine contains 12 slides divided into three groups of four so that when the trolleys 62 and 68 are retained in their most forward position by the spring link 88, any one of the slides in one of the groups can be positioned in the focal plane of the projection system by the operation of the drum cam 94. Also, upon operation of one of the shift keys of the keyboard, a thrust is applied to the forward end of the lower trolley 68 which moves the trolleys 62 and 68 a short distance rearwardly to a position in which the drum cam 94 can cause movement of any one of a further group of the slides in the magazine 2 into the focal plane of the projection systems. Similarly, operation of the other shift key causes rearward movement of the trolleys 62 and 68 to a position in which the drum cam can cause movement of any one of the remaining groups of slides into the focal plane of the projection system.

The rearward movements of the trolleys 62 and 68 caused by the actuation of the shift keys are effected by the shift key solenoids 100 and 102 which are respectively energised upon operation of the shift keys. Armatures 104 and 106 of the shift key solenoids are respectively connected by links such as the link 108 to the abutment 90 and a similar abutment parallel with the abutment 90 and mounted on the lower trolley 68.

The track 96 of the drum cam 94 is shaped so that upon rotation of the drum to positions angularly spaced apart by 90° the drum causes movements of the roller 98 which in turn effect movements of the upper trolley 62 relative to the lower trolley 68 so as to bring respective slides of one of the three groups of slides in the magazine 2 into the focal plane of the projection system.

The driving mechanism for effecting appropriate rotary movements of the drum cam 94 is illustrated in FIGS. 7 and 8 and comprises a plate 110 on a lower surface of which are mounted at angular intervals of 90° four solenoids 112 (only one shown in FIG. 8). These solenoids include armatures 114 which when the solenoids are deenergised project through the upper surface of the plate 110. The solenoids when energised attract the armatures 114 to positions below the upper surface of the plate 110. Energisation of the solenoids 112 is effected by operation of the character keys on the keyboard of the machine through energisation of appropriate relays which upon actuation of a character key cause three of the four solenoids to be energised whilst the remaining solenoid is de-energised. Thus, by depressing a character key on the keyboard, one of the armatures 114 is projected to a position in which it extends above the upper surface of the plate 110 and acts as a stop.

Because of the movements of the trolleys 62 and 68 caused by the operation of the shift keys, it will be appreciated that it is necessary to provide a flexible drive for operating driving shaft 95 of the drum cam 94. To this end a flexible drive output member 116 is coupled via the shaft 117 to a stop arm 118 arranged for rotation on the upper surface of the plate 110. A spiral torsion spring 120 is secured at one end to a post 122 provided on an outer end of the arm 118 whilst the other end of the spring 120 is secured to a spring arbor 121 which in turn is secured to a ratchet wheel 124 and gear wheel 126, the spring arbor, ratchet wheel 124 and gear wheel 126 being rotatably mounted on a stub shaft 128 which projects upwardly from the inner end of the stop arm 118. Co-operating with gear wheel 126 is a further gear wheel 130 which is mounted on a shaft 132 of an electric motor 134 employed to wind the spring 120. When spring 120 is slack and the arm 118 is in contact with one of the armatures 114, the motor 134 drives until the energy stored in the spring balances the motive power of the motor. So as to avoid hunting about this point of balance, a fixed pawl 123 is spring biased towards the ratchet wheel 124 to prevent any tendency of the spring to unwind from the end attached to the spring arbor.

Upon depression of a character key, one of the armatures 114 is projected upwardly and the armature which is restraining arm 118 is attracted downwardly and rotation of the arm 118 takes place until contact is made with the upwardly projected armature. This rotation of the arm 118 drives the output member 116, and, therefore, the drum cam to a position in which the matrix slide bearing the character of the key depressed is brought into the focal plane of the optical projection system.

The means for moving a slide in the focal plane of the projection system to align a selected character on the slide in the optical path will now be described with reference to FIGS. 4, 5, 9 and 10.

A slide 136 (see FIG. 9) is arranged to move in a groove formed in a lower part of the matrix magazine and is formed with a downwardly projecting part 138 including a central upwardly tapering recess 140. On either side of the central aperture 45 of the slide are provided respective rows each containing six characters. When the slide 136 is disposed in the focal plane of the projection system there is engaged within the recess 140 an upper blade-like part 142 of a flicker arm 144.

The flicker arm 144 includes an upper part 146 in which the blade-like part 142 is mounted and a lower part 148 within which a lower end of the part 146 is telescopically engaged running on roller bearings and biassed upwardly in known manner by a helical biassing spring (not shown).

At its lower end, the arm 144 is mounted on a transverse shaft 150 which is supported in bearings 152. The shaft is rotatable in opposite senses by energisation of respective rotary solenoids 154 and 156.

At its upper end the flicker arm is arranged to move between parallel guide plates 160 which are formed with opposed horizontal tracks 162 within which engage rollers 164 projecting from opposite sides of the upper part 146 of the flicker arm 144 and moving with said upper part 146.

Figure 9:
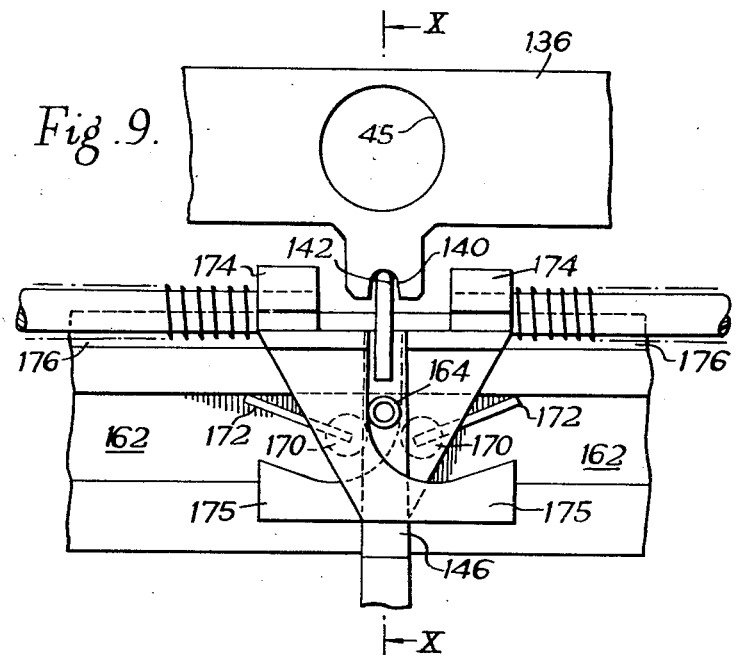
FIG. 9 is an elevation drawn to a larger scale than the other figures and illustrating means for moving the matrix slides longitudinally.

Within the track 162 in each plate 160 are stepped track parts 166 which terminate at their inner ends in curved track parts 168. Also mounted on arbors 170 and extending above the track parts 166 and 168 are provided leaf switches 172 which are spring biassed upwardly. Upon movement of the flicker arm to the left or right as shown in FIG. 9, the rollers 164 pass over one of the leaf switches 172 which by virtue of its biassing spring flicks back to the position shown in FIG. 9 upon traverse thereof by the roller 164. As the flicker arm rollers 164 return along the track 162, they are thus obliged to proceed along track part 168 and in so doing the flicker arm part 146 is moved downwardly in the part 148 to an extent whereby the blade-like part 142 disengages the recess 140 in the slide. After the blade-like part 142 has cleared the recess 140, the helical biassing spring in the flicker arm part 148 forces the upper part 146 of the flicker arm upwardly to the position shown in FIG. 9, to which position it is guided as described below.

Figure 10:
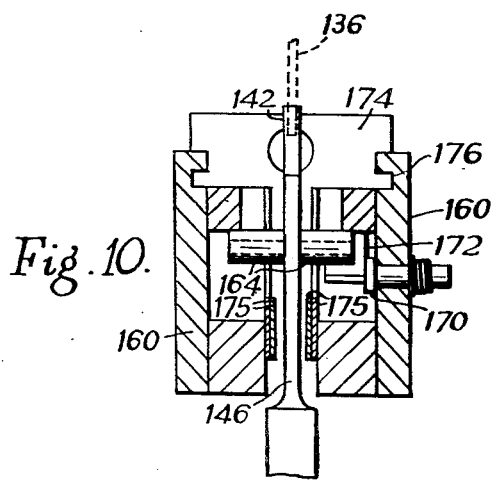
FIG. 10 is a sectional view taken on the line X—X of FIG. 9.

As the flicker arm moves from its central position, it forces one or other of spring biassed plungers 174 outwardly against the action of the biassing spring thereof and the return movement of the flicker arm is thus speeded up. The plungers 174 run in opposed tracks 176 provided in the plates 160. Each plunger 174 carries a pair of curved guide plates 175 on one pair of which, depending on the direction in which the flicker arm is moving, the rollers 164 ride as the upper part 146 of the flicker arm returns to its rest position. The guide blades attached to one plunger 174 mesh with the pair attached to the other plunger as can be seen in FIG. 10.

Thus upon energisation of one of the rotary solenoids 154 and 156 caused by depressing a character key, the flicker arm moves the slide 136 to one side until the leading end of the slide or spring biassed plunger 174 contacts a stop pin 177 which is moved into the operative position by a solenoid which is energised by the depressing of the character key. When in contact with the stop, the slide is positioned so that an image of the appropriate character can be exposed. Six stop pins 177 and solenoids are provided on each side when the slide has 12 characters mounted, six on each side of the central opening.

After exposure of the character, the rotary solenoid is deenergised and the flicker arm is returned to the position shown in FIG. 7 by one of the plungers 174. The slide is returned to its central position by means of spring biassed plunger 174. Simultaneously stop pin 177 drops out of the path of the slide.

When employed with the usual four row keyboard, the keys are divided into a left and a right hand group. In each group, any key in a particular row is adapted to actuate the solenoids 112 so as to cause the armature 114 to be projected above the plate 110 of the driving mechanism for the drum cam. Thus, the keys in any one row for a given position of the shift keys, will all operate to bring a particular slide into the focal plane of the projection system. Further, the keys of each column of keys in the left hand group of keys are arranged both to actuate the appropriate rotary solenoid 154 or 156 and to cause movement of a particular stop for limiting the longitudinal movement of the matrix slides. Similarly in the right hand group of keys, each key in a particular column of keys is arranged both to actuate the appropriate rotary solenoid 154 or 156 and to cause positioning of a stop for limiting the longitudinal movement of the matrix slide.

The overall operation of the apparatus can now be appreciated. The keyboard operator moves the graduated dial thereby rotating the turret plate 4 to a position in which a predetermined matrix magazine is disposed in the optical path of the projection system. A thrust can then be applied either manually or automatically to the forward end of the trolley 68 to effect rearward movement of both the trolleys 62 and 68 so as to engage the selected magazine in the upper trolley 62. Upon relieving the rearward thrust applied to the lower trolley, the spring link 88 returns both trolleys to their most forward position. In this position, depressing of a character key will first actuate the solenoids 112 thereby effecting positioning of the drum cam 94 with consequent positioning in the focal plane of the projection system of the appropriate slide of the group of four slides associated with operation of the apparatus in which neither shift key is actuated. A very short interval after the energisation of solenoids 112 causes the appropriate slide to be positioned in the focal plane of the projection system, one or other of the rotary solenoids 154 and 156 is energised and the slide is longitudinally moved into contact with the stop which was operated by depression of the character key. The slide is thus brought into position for exposure of the character appropriate to the key depressed. After exposure the rotary solenoid 154 or 156 is de-energised and the slide is thus returned to its central position in the focal plane of the apparatus by a spring biassed plunger. The retraction of the flicker arm during the return movement enables it to return to the central position without interfering with movements of the magazine and this permits of an overlap of operations to increase the operating speed. Thus the movement of the matrix magazine to bring a subsequent slide into the focal plane can take place during the return of the flicker arm to its central position without fouling of the slides by the flicker arm.

Upon actuation of one of the shift keys, the shift key solenoid is actuated thereby moving the trolleys 62 and 68 simultaneously against the action of the spring link 88 to a position in which any one of the four slides associated with the shift key actuated can be moved by the action of the drum cam 94 into the focal plane of the projection system. The sequence of operations now occasioned by depressing of a character key is similar to that described above.

When it is desired to change from operation with one font of type to operation with another font of type, the keyboard operator causes a thrust to be applied either manually or automatically to the forward end of the lower trolley 68 whereby the magazine held in the upper trolley 62 is replaced on the turret plate 4. Relief of the thrust applied to the lower trolley 68 then returns both trolleys to their most forward position, whereupon the keyboard operator can rotate the graduated dial so as to select the desired font in one of the other magazines. After selection of the desired font, the trolleys 62 and 68 are again moved rearwardly so that the matrix magazine appropriate to the desired font can be engaged in the upper trolley 62.

Figure 11B:
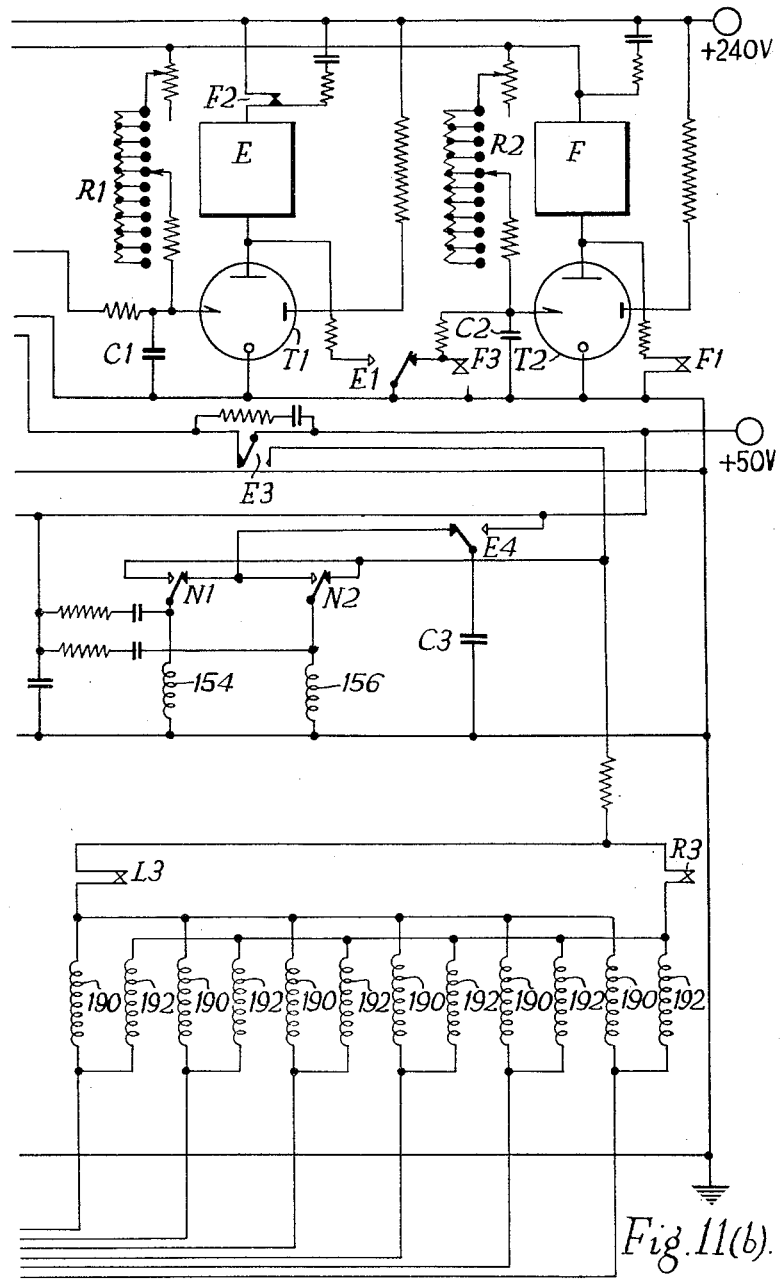
FIG. 11 is a diagram of an electrical circuit operated by the keyboard, which may be used in association with the apparatus shown in FIGS. 2 to 10.

The apparatus described above with reference to FIGS. 2 to 10 of the drawings may have three groups of 4 slides in each magazine. In the normal, forward position of the trolleys 62 and 68, one group of 4 slides is in the operative position in which one of its slides may be moved into the focal plane. By operation of one of the shift keys a second group of slides is brought into the operative position and by operation of the second shift key, the third group of slides is placed in the operative position. This movement is effected by solenoids 100 and 102, the energising circuits of which are made by the actuation of the shift keys. A suitable electrical circuit for performing the remaining three processes is shown in FIG. 11 and is arranged so that one cycle must be completed before it is possible to initiate a second cycle. In the circuit shown each key of the keyboard operates three pairs of switch contacts; the first, selecting one of the 4 slides; the second, selecting either left or right of centre, and the third selecting one of six characters. The keyboard contacts each operate relays, the contacts of which make and break the operating electric circuits. It is necessary for the sequence of operations to be performed to a strict time schedule and to this end, two cold cathode trigger tubes $T_1$ and $T_2$ (Mullard tubes Z803(U)) are used.

The detailed operation of the circuit is as follows with reference to the circuit diagram.

The operation of one of the keyboard contacts K1, K2, K3 and K4 energises the corresponding relay A, B, C or D. These high speed relays each have two pairs of change-over contacts A1 and A2, B1 and B2, C1 and C2 and D1 and D2 respectively. When one of these relays is energised, the normally open contact of its first pair of contacts becomes closed and self-locks the relay and the normally closed contact of this pair becomes open and initiates the first electronic delay time which is set by the values of condenser C1 and resistance R1. The operation of the second pair of contacts (one of A2 to D2) disconnects the corresponding solenoid 112 (see FIG. 7) from the circuit when the normally closed contact becomes open, and energises the other three solenoids 112, via the normally open contact when it becomes closed. The energising of these three of the solenoids 112 withdraws their armatures 114 from the stop positions in the motor and spring drive unit of FIG. 7 and the latter acts to rotate the drum cam 94 to a position determined by the protruding armature 114 of the unexcited solenoid 112 as previously described. The cam 94 moves the trolley 62 and consequently the magazine carried thereby to a position in which the appropriate slide is in the focal plane. One of the pair of keyboard contacts KL (left) and KR (right) is made simultaneously with the slide selection contact (one of K1 to K4) and energises either relay L or relay R. Each of the relays L and R has respectively a self-locking contact L1, R1 and a contact L2, R2 which open-circuits the other of relays L and R, and a third contact L3, R3. The contact L3 serves to connect one terminal of the group of solenoids (190 in FIG. 11) actuating the six left-hand stop pins, and R3 connects one terminal of the group of solenoids (192 in FIG. 11) actuating the six right-hand stop pins, to the power supply (50 v.) The operation of one of the contacts KP1 to KP6 energises one of the relay G, H, I, J, K and M, each of which has one contact, respectively G1, H1, I1, J1, K1 and M1, which both self-locks the relay and energises one of the six left or right stop pin solenoids, and has five other normally closed contacts which become open and which open-circuit the other five relays G to M. These five other contacts are respectively shown at G2, G3, G4, G5 and G6, H2 to H6, I2 to I6, J2 to J6, K2 to K6 and M2 to M6. In this manner one stop pin of the left-hand or right-hand group is moved by its corresponding solenoid into the path of the slide so that when the latter is moved to left or right as the case may be, a particular pre-set position is obtained. The slide is moved left or right by the action of one of the pair of rotary solenoids 154 and 156. The return action may be caused by a spring as described above when the operative solenoid has been deenergised or it may be caused by a pulse of excitation on the previously unexcited solenoid. The circuit of FIG. 11 shows the latter system and is simplified when a spring return system is used. Relay N is a slow to make and slow to break relay, and has two pairs of changeover contacts N1 and N2, so arranged that in the normal position, the left rotary solenoid 154 is connected to condenser C3 (which is charged up while a relay E is energised), the source of pulse power for the return action, and the right rotary solenoid 156 is connected to the normally open contact E3 of relay E. When relay N is energised, these connections are reversed. At the end of the first electronic delay, the cold cathode trigger tube fires and energises relay E which self-locks on the normally open contact of change-over contact E1 and which initiates the second electronic delay time, set by C2 and R2 when the normally closed contact of E1 becomes open. The E2 contact simultaneously de-energises the previously selected relay A, B, C or D which becomes reset and partly ready for the next cycle of operations. Contact E3 changes over, de-energising three of the slide selection solenoids 112 and energising either the left or right rotary solenoid 154 or 156 so that the slide is moved out to the previously selected stop pin. This position is maintained until the expiration of the second electronic delay time when the other trigger tube T2 fires energising relay F which self-locks on contact F1. Contact F3 discharges C2 resetting the second electronic delay. Contact F2 opens, de-energising relay E so that the rotary solenoid which was excited to move the slide to the stop pin becomes de-energised via contact E3, and change-over contacts E4 operate so that C3 which had been charged to the supply voltage is now discharged through the other rotary solenoid returning the slide to centre.

In order to achieve the fastest overall speed it is clearly desirable that this return action should be allowed to take place during the selection process for slides, left and right, and stop pin, for the next cycle. This is achieved by making relay N slow to make and slow to break such that its operating time is just less than the first electronic delay time, and therefore C3 will be connected to the returning rotary solenoid during this period. Contact F4 becomes open and when relay F is energised this resets the left and right relays and the stop pin relays. The system is now completely reset and a further character can be selected.

If a key is held down then the corresponding character is produced repetitively, at the maximum machine operating speed.

The keyboard used with the apparatus of the invention may be a conventional type keyboard provided with rows of characters and with shift keys for increasing the number of rows made available. For the electrical system just described the rows of keys are divided similarly to the slides so that the keys of the left-hand half of the keyboard operates one of the rotary solenoids which moves the flicker arm and the keys of the right-hand half of the keyboard operates the other rotary solenoid moving the flicker arm in the reverse direction. Similarly the keys on one side of the keyboard operate the stop-pin solenoids on one side of the matrix magazine and those on the other side of the keyboard the stop-pin solenoids on the other side of the magazine.

I claim:

1. In photographic type composing apparatus of the kind in which individual characters are selected from a character matrix and located in the required position in an optical projection system for the projection of images thereof onto a radiation sensitive surface on which composing takes place, a matrix magazine carrying a number of slides which are arranged one behind the other parallel to one another and each of which provides a row of characters, means for moving the matrix magazine towards and away from the radiation sensitive surface so as to bring a selected slide into the focal plane for projection and means for moving the slide in the focal plane to align the selected character in the optical path of the projection system.

2. Photographic type composing apparatus as claimed in claim 1, and comprising a keyboard having a number of shift keys, in which each row of characters on a slide corresponds to a row of characters on the keyboard and the number of slides carried by the matrix magazine corresponds to the number of rows of characters made available by the keyboard in conjunction with the shift keys.

3. Photographic type composing apparatus as claimed in claim 2, in which the slides are grouped in sections, one grouped section of slides corresponding to the rows of characters made available by the keyboard without use of a shift key and the other grouped sections of slides corresponding to the groups made available by operation of the shift keys, the said one grouped section of slides normally being in the operative position in which actuation of a key will operate to move the matrix magazine to bring the slide carrying the selected character into the focal plane and to move this slide in the focal plane to align the selected character in the optical path, the actuation of one of the shift keys serving to move the matrix magazine so as to bring the corresponding grouped section of slides into the operative position for selection of one of its slides and characters by actuation of a key.

4. Photographic type composing apparatus as claimed in claim 3, in which the slides are arranged to move longitudinally in guides in the magazine in both directions from a rest position so that a character on one half of the slide is brought into the optical projection path by movement in one direction and a character on the other half of the slide is brought into the said path by movement in the other direction.

5. Photographic type composing apparatus as claimed in claim 4, in which the slide located in the focal plane is engaged by a pivotally mounted arm or lever which is rotated on actuation of a key to move the slide to make contact with a stop pin, which locates the slide in the desired position and is also moved into its operative position on actuation of the key, the number of stop pins provided corresponding to the number of characters on a slide.

6. Photographic type composing apparatus as claimed in claim 5, in which the pivotally mounted arm or lever is rotated by a rotary solenoid which is energised on actuation of a key of the keyboard.

7. Photographic type composing apparatus as claimed in claim 5 in which each stop pin is moved into its operative position by a solenoid which is energised by actuation of the pertinent key.

8. Photographic type composing apparatus as claimed in claim 7, in which actuation of a key first sets in motion an electrical drive operating through a drum cam which moves the matrix magazine into the position in which the slide carrying the selected character is in the focal plane, then energises the rotary solenoid to move the slide and the stop pin solenoid corresponding to the selected character to locate the slide.

9. Photographic type composing apparatus as claimed in claim 1 in which the matrix magazine comprises a rectangular box, said slides being transparent and arranged to move longitudinally in guides in the box to protrude from at least one end of the box, each slide having a row of characters formed thereon.

10. A matrix magazine for photographic type composing apparatus comprising a rectangular box carrying a number of transparent slides arranged to move longitudinally in guides in the box to protrude from one or the other end of the box, a central aperture in each of the facing longitudinal walls of the box parallel to the slides, a central aperture in each of the slides and characters arranged on each of the slides on each side of the central aperture therein.

11. In a photographic type composing apparatus in which individual characters are selected from a character matrix and located in the required position in an optical projection system for the projection of images thereof onto a radiation sensitive surface on which composing takes place, a mounting for a plurality of matrix magazines, each carrying a number of slides providing rows of characters, means for locating the mounting in different positions, in each of which a magazine is disposed in the optical path of the projection system, means for adjusting the position of the magazine in said optical path so as to bring a selected matrix slide in the magazine into the focal plane of the optical projection system and means for moving the slide in the focal plane to align a character carried thereby for projection onto the radiation sensitive surface.

12. Photographic type composing apparatus as claimed in claim 11, in which the mounting comprises a rotatable turret plate carrying a number of radially disposed matrix magazines, means being provided to rotate the turret plate to bring a selected magazine into position in the optical path of the projection system.

13. Photographic type composing apparatus as claimed in claim 11, in which they are provided means for withdrawing the matrix magazine disposed in the optical path from the mounting whilst retaining the magazine in the optical path and means for adjusting the position of the withdrawn magazine to bring a slide into the focal plane of the projection system.

14. Photographic type composing apparatus comprising a vertically positioned turret plate arranged to rotate on a horizontal axis, a plurality of matrix magazines radially disposed on the said turret plate, each magazine carrying a number of slides providing rows of characters, means for rotating the turret plate to bring it into a number of different positions in each of which a magazine is disposed in the optical path of the projection system, horizontally movable means for disengaging and withdrawing from the turret plate the magazine disposed in the optical path of the projection system and for holding the magazine in the said optical path, means for moving the withdrawn magazine towards or away from the radiation sensitive surface so as to bring a selected matrix slide into the focal plane of the projection system and means for moving the slide in the focal plane to align a character for projection onto the radiation sensitive surface.

15. Photographic type composing apparatus as claimed in claim 14, in which the means for withdrawing the magazine and holding it in the optical path comprises a horizontally movable trolley, which is movable towards and away from the turret plate and is provided with means for disengaging the magazine from its mounting on the turret plate and with means for engaging the magazine matrix and retaining it in position on the trolley.

16. Photographic type composing apparatus as claimed in claim 15, in which the slides in each matrix magazine are arranged in grouped sections of adjacent slides and the trolley is arranged to be located in a number of positions corresponding to the number of grouped sections, in each of which positions one of the grouped sections is in the operative position in which one of its slides can be brought into the focal plane by movement of the trolley in response to the actuation of a character selection key.

17. Photographic type composing apparatus as claimed in claim 16, in which the said trolley moves jointly with a second horizontally movable trolley to disengage a matrix magazine from the turret plate and to be located in one of said number of positions and is moved relatively to the said second trolley by means of a drum cam to locate a slide in the focal plane.

18. Photographic type composing apparatus as claimed in claim 1, in which the slides are arranged to move longitudinally in guides in the magazine in both directions from a rest position so that a character on one half of the slide is brought into the optical projection path by movement in one direction and a character on the other half of the slide is brought into the said path by movement in the other direction.

References Cited in the file of this patent

UNITED STATES PATENTS 2,207,265     Ogden _____ July 9, 1940

FOREIGN PATENTS 762,822     Great Britain _____ Dec. 5, 1956